1,471,702

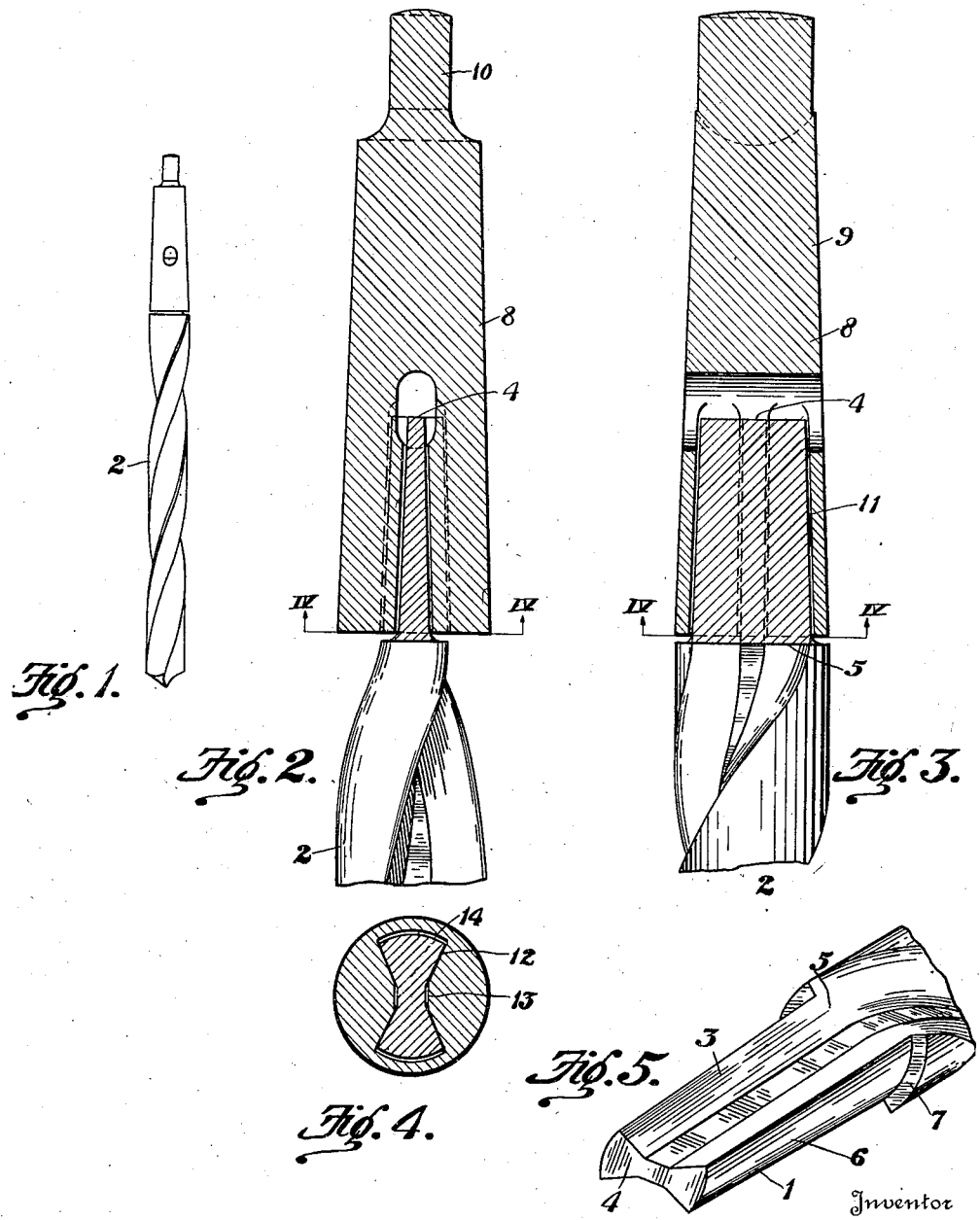

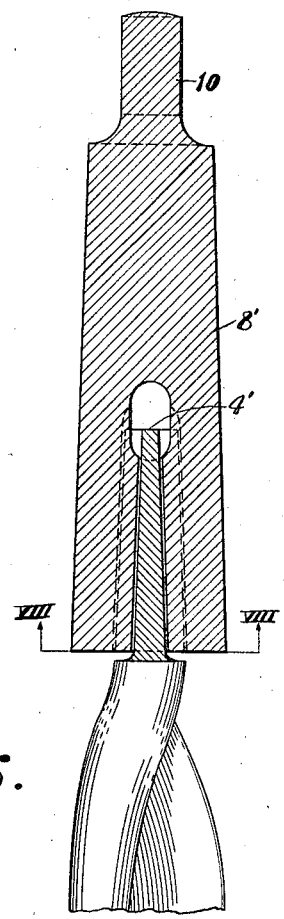
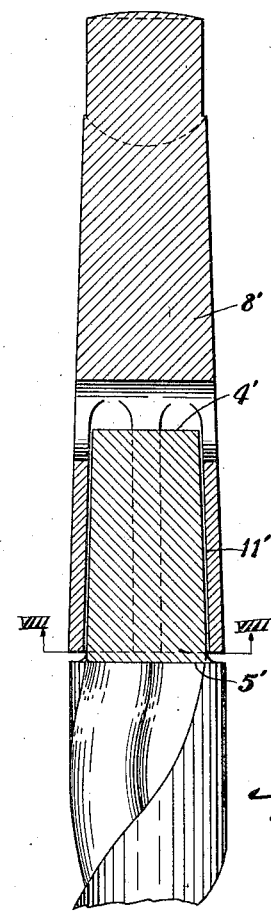
Fig. 6.  Fig. 7.
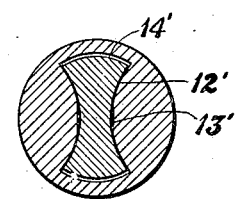
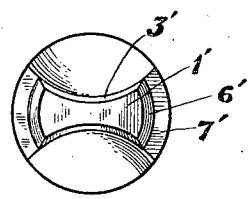
Fig. 8.  Fig. 9.
Inventor
Anthony A. Mulac Patented Oct. 23, 1923.

UNITED STATES PATENT OFFICE.

ANTHONY A. MULAC, OF ALLIANCE, OHIO, ASSIGNOR TO THE BUCKEYE TWIST DRILL COMPANY, OF ALLIANCE, OHIO, A CORPORATION OF OHIO.

DRILL SHANK AND SLEEVE SOCKET.

Application filed May 27, 1921. Serial No. 473,015.

*To all whom it may concern:*

Be it known that I, ANTHONY A. MULAC, a citizen of the United States, residing at Alliance, in the county of Stark and State of Ohio, have invented a new and useful Improvement in Drill Shanks and Sleeve Sockets, of which the following is a specification.

The invention relates to the shank of a twist drill or the like, and to a sleeve socket for receiving and holding the shanks of drills of different sizes and engaging in a standard spindle socket of a drilling machine.

The formation of a shank on each drill to fit directly into the machine socket, not only involves the expense of making, but the cost of the additional expensive steel required for such a shank; and the present invention involves the use of an integral straight end portion of the fluted stock from which the drill is twisted, for the formation of the shank.

When the peripheral edges, or the faces of the flutes at the thinnest portions of the shank, impinge and co-act with corresponding walls of a socket, it is difficult, if not impossible, to fit the faces of the flutes to the corresponding walls of the socket, so as to co-act with these faces throughout the entire length and width thereof; and the present invention involves the use of a fluted shank having longitudinally tapered faces on each side in wedging contact with the walls of the socket when entered therein.

As the improved form of drill shank will not fit a standard spindle socket, and to avoid the use of a chuck or socket having movable clamping members; the invention also involves the use of a one piece rigid sleeve socket having one end tapered to fit a standard spindle socket, and provided with a longitudinally tapered socket shaped to receive the improved drill shank and to wedge fit the faces only of the flutes thereof.

The invention may be embodied in the forms of shanks and sleeve sockets illustrated in the accompanying drawings, forming part hereof, in which—

Figure 1 is a side elevation of a twist drill having its shank in an improved sleeve socket;

Fig. 2, an enlarged longitudinal section of the shank and socket through the middle line of the flutes;

Fig. 3, a similar section through the width of the shank;

Fig. 4, an end view of the sleeve socket, showing the drill shank in section on lines IV—IV, Figs. 2 and 3;

Fig. 5, a fragmentary perspective view of the shank shown in Figs. 2, 3 and 4;

Fig. 6, an enlarged longitudinal section of a shank and socket through the middle line of concave flutes;

Fig. 7, a similar view through the width of the shank;

Fig. 8, an end view of the socket, showing the shank in section on line VIII—VIII, Figs. 6 and 7; and Fig. 9, an end view of a shank having concave flutes.

Similar numerals refer to similar parts throughout the drawings.

The shank 1 or 1' of a twist drill 2 or the like, is formed from an integral straight end portion of the same stock from which the drill is twisted; and the flute may be formed with concavely inclined flat faces 3 as shown in Figs. 2 to 5, or concavely curved faces 3', as shown in Figs. 6 to 9; and in each case, the faces of the flutes are longitudinally tapered uniformly from the base to the free end of the shank, so that the shank is thinner at the free end 4 or 4', than at the base 5 or 5' where it joins the body of the drill.

The peripheral edges 6 or 6' of the shank, are also tapered longitudinally; and when the diameter of the drill is greater than the base width of the shank, there is formed a shoulder 7 and 7' at each side of the shank which shoulder will vary in width according to the diameter of the drill.

The sleeve socket 8 or 8' is made with a tapered round exterior 9 having a flattened portion 10 at its smaller end in the usual manner for fitting and engaging in a standard spindle socket of a drilling machine; and in its larger end is formed a socket 11 or 11' having longitudinally tapered flat walls 12, or convex walls 12', for rigidly fitting and wedge engaging the corresponding flute faces 3 or 3' on the sides of the shank.

In either case the protruding middle portions of the socket walls may be flattened to form the longitudinal facets 13 or 13' in the median line of the socket, which facets are spaced apart so as not to impinge the corresponding median zones of the flute faces; and the narrower side walls 14 and 14' of the socket, corresponding to the peripheral edge faces 6 or 6' of the shank, are so curved and tapered that they will not impinge the circumferential edge portions of the shank; thereby limiting the contact of the shank in the socket to the laterally spaced tapered faces of its flutes, which are wedged between the corresponding faces of the socket when the shank is entered endwise into the socket, the parts being so proportioned that the shank will be wedged into the socket before the shoulders 7 at the base of the shank impinge the end of the sleeve.

The wedging action and the torsional contact of the sleeve socket, thus extends throughout the entire length and breadth of the flute faces of the shank, without being interfered with by any contact between the peripheral edges or the median zones of the flute of the shank with the adjacent faces of the socket; and by these means the shank will be securely held in the socket when wedged therein, and will be positively turned without any looseness or lost motion when rotated by the socket.

It will be understood that a single sleeve socket of a size for entering a particular standard spindle socket may be used for receiving and holding drills of different diameters, the only requirement being that the shanks shall have their flute faces shaped and tapered to fit the corresponding walls of the socket; and that shanks of various diametric widths may be used in the same socket, whenever this width is less than the corresponding diameter of the socket.

It will also be understood that it is not essential to flatten the protruding middle portions of the socket walls, to prevent contact with the median zones of the flutes; but such a flattening is preferred, especially for flutes having flat faces, to facilitate the fitting of the shank in the socket.

I claim:—

1. A drill or the like having an integral straight shank with concave flutes on opposite sides extending from like flutes in the body of the drill, the faces of the flutes being uniformly tapered longitudinally from the base to the end of the shank.

2. A drill or the like having an integral straight fluted shank with the faces of the flutes uniformly tapered longitudinally from the base to the end of the shank, and a rigid sleeve having a socket with longitudinally tapered walls wedge fitting and contacting only with the faces of the flutes.

3. A drill or the like having an integral straight fluted shank with the faces of the flutes uniformly tapered longitudinally from the base to the end of the shank, and a rigid sleeve having a socket with longitudinally tapered walls wedge fitting and contacting only with laterally spaced side portions of the faces of the flutes.

4. A rigid sleeve socket for drilling machines having one end rounded and tapered to fit a standard spindle socket, and a socket in the other end having walls longitudinally tapered uniformly throughout the length wedge fitting like tapered flutes in the shank of the drill.

5. A rigid sleeve socket for drilling machines having one end rounded and tapered to fit a standard spindle socket, and a socket in the other end with longitudinally tapered side walls wedge fitting like tapered flutes in the shank of the drill, the other side walls being spaced from the peripheral edges of the shank.

6. A rigid sleeve socket for drilling machines having one end rounded and tapered to fit a standard spindle socket, and a socket in the other end with longitudinally tapered side walls wedge fitting like tapered flutes in the shank of the drill, there being a longitudinal facet in the median line of each wall spaced from the face of the flute.

7. A rigid sleeve socket for drilling machines having one end rounded and tapered to fit a standard spindle socket, and a socket in the other end with longitudinally tapered side walls wedge fitting like tapered flutes in the shank of the drill, the other side walls being spaced from the peripheral edges of the shank, and there being a longitudinal facet in the median line of each wall spaced from the face of the flute.

ANTHONY A. MULAC.